Figure 1:
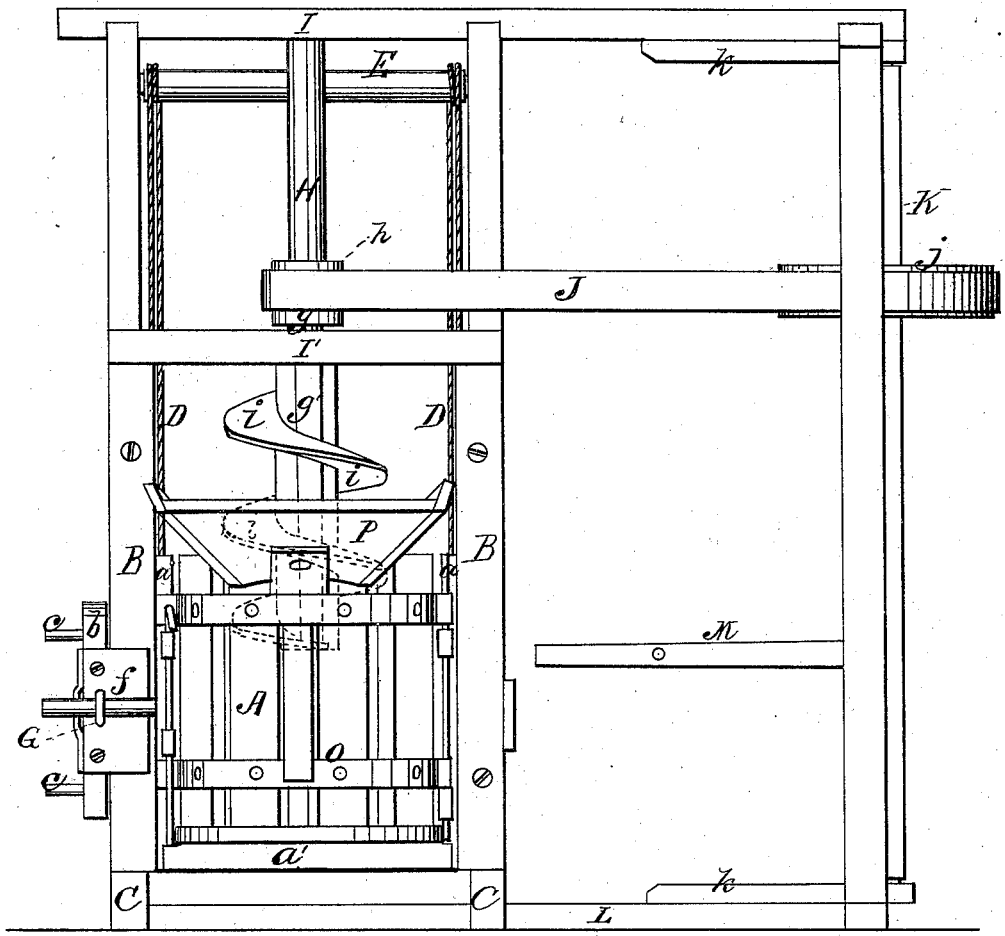

R. MACKEY & M. GREEN.
Cotton-Press.

No. 166,119.

2 Sheets--Sheet 1.

Patented July 27, 1875.

WITNESSES
Robert Everitt
Frank J. Masi

INVENTORS
Robert Mackey
Matthew Green
Chipman Hosmer & Co
ATTORNEYS

2 Sheets--Sheet 2.
R. MACKEY & M. GREEN.
Cotton-Press.
No. 166,119. Patented July 27, 1875.
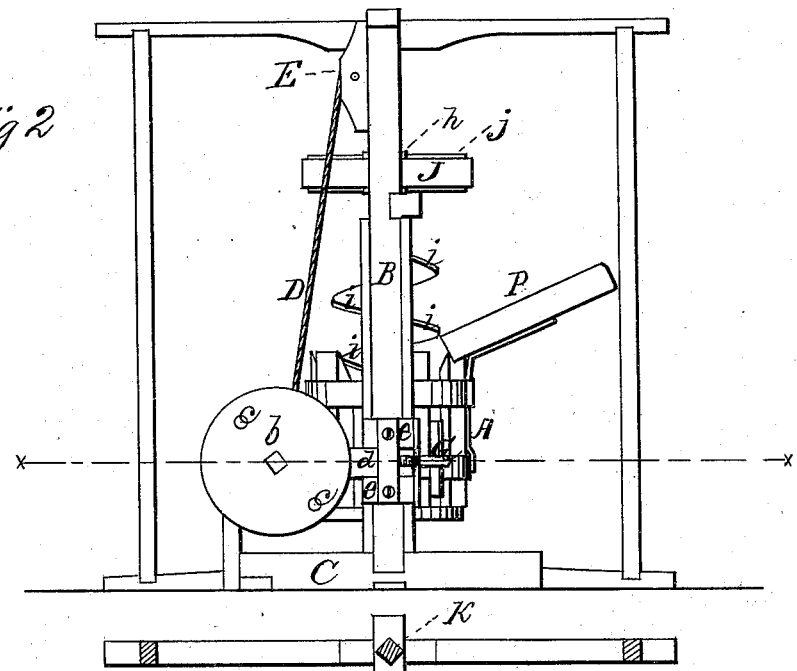
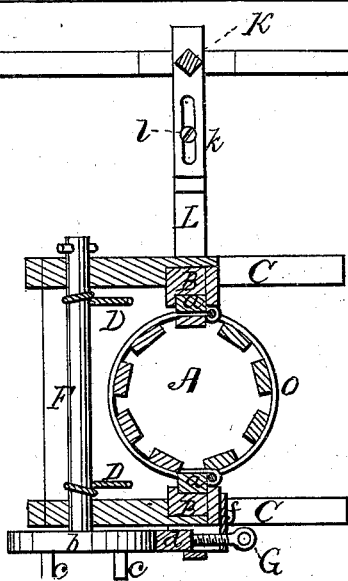
WITNESSES
Robert Everitt
Frank J. Masi
INVENTOR
Robert Mackey
Matthew Green
Chipman Hosmer & Co
ATTORNEYS

UNITED STATES PATENT OFFICE.

ROBERT MACKEY AND MATTHEW GREEN, OF NEVADA, MISSOURI.

IMPROVEMENT IN COTTON-PRESSES.

Specification forming part of Letters Patent No. 166,119, dated July 27, 1875; application filed February 20, 1875.

*To all whom it may concern:*

Be it known that we, ROBERT MACKEY and MATTHEW GREEN, of Nevada, in the county of Vernon and State of Missouri, have invented a new and valuable Improvement in Cotton-Presses; and we do hereby declare that the following is a full, clear, and exact description of the construction and operation of the same, reference being had to the annexed drawings making a part of this specification, and to the letters and figures of reference marked thereon.

Figure 1 of the drawing is a representation of a side view of our press. Fig. 2 is a front view of the same, and Fig. 3 is a sectional detail view.

This invention has relation to improvements in devices for pressing cotton, hay, and other analogous substances for the purpose of reducing their mass to a suitable size for baling; and the nature of the invention consists in combining with a press-box vertically movable in guides, and adapted to be rigidly held in any position of vertical adjustment, a vertically-arranged horizontally-rotating shaft, having a broad helical flange coiled thereon and rigidly secured thereto, whereby the length of a bale is capable of being regulated at will, and the screw when actuated is endowed with a double function—that of feeding the substance to be operated on automatically into the press-box, and at the same time compressing the same, as will be hereinafter more fully explained.

In the annexed drawings, A designates a cylindrical press-box, having open slatted sides and a close bottom, which is arranged in a frame consisting of two side bars, $a$, and an end bar, $a'$, connecting the lower end of the same, as shown in Fig. 1. This frame is arranged in guides between two uprights, B, rigidly secured in any suitable manner to joists C, arranged on or buried into the soil, and it is capable of being raised or lowered at pleasure by means of ropes or chains D, rigidly secured to the upper ends of side bars $a$, passing thence upward over a preferably grooved roller, E, and downward to a winding-drum, F, having its bearings in a suitable frame at one side of uprights B, and operated by means of a wheel, $b$, and handles $c$ in the nature of a crank-arm. Wheel B has a broad flat periphery, for a purpose hereinafter explained. When the winding-drum F is actuated ropes D will be wound about the same, causing the press-box to be raised, and when the desired degree of adjustment has been thus obtained it is secured by locking the said drum against rotation in the following manner, to wit: An endwise-movable brake, $d$, is arranged and allowed to have endwise horizontal movement between guiding-blocks $e$, rigidly secured to upright B, as shown in figure. This brake is adapted to be forcibly thrust against the flat periphery of wheel $b$ by means of a set-screw, G, passing through a strong metallic plate, $f$, rigidly secured to the said upright and to the ends of blocks $e$ farthest from the wheel actuating the winding-drum. Any desired degree of vertical adjustment having been obtained, as above described, the set-screw G will be set up, causing the brake to be forcibly thrust against the periphery of the wheel, securely locking the winding-drum against rotation, and maintaining the adjustment as long as may be requisite. H designates a vertical shaft rotating in bearings upon transverse braces I I' of uprights B, and prevented from upward or downward displacement by means of a collar, $g$, above and an octagonal enlargement, $g'$, below brace I', as shown in Fig. 1. Enlargement $g'$ of shaft H is provided with a broad flange, I, helically coiled around and extending quite to the end of the same, which flange and shaft snugly fill up the space within the cylindrical press-box, their combined diameters being slightly less than that of the said press-box. Shaft H is endowed with rotation by means of a band-wheel, $h$, keyed thereon, and an endless belt, J, passing around a large pulley-wheel, $j$, keyed upon a rotating shaft, K, having its bearings in arms $k$, which are adjustable to or from the press-box by means of a slot cut longitudinally in the said arms, and a clamp-screw, $l$, passing through the same into sills L, upon which the press-frame is supported. Actuating-shaft K may be operated by means of a detachable lever, M, and it is made adjustable to or from the press-box, for the purpose of allowing the said lever to be detached, and a longer or shorter one substituted according to the degree of power to be obtained. When shaft H is actuated by any suitable motor its rotation will instantly, by an action the reverse of that of an auger, which discharges the cuttings out of the hole being bored, cause the substance fed to it to be thrust down into the press-box, each successive feeding being distributed upon that first placed therein, and each layer being successfully compressed during such distribution until the press-box is filled, the quantity or weight of the substance capable of being pressed therein being in proportion to the power of the motor. The compressed mass is then tied up and removed through a semi-cylindrical door, O, in the side of press-box A.

In practice I propose to use a detachable hopper, P, for feeding the press-box, as by this means the operator's hand is less liable to be caught by flanges $i$ and crushed. I also arrange it in an inclined position, that by this means the descent of the substance to the press-box, within reach of the said flanges, may be facilitated.

What we claim as new, and desire to secure by Letters Patent, is—

1. In a cotton-press, the cylindrical press-box A, vertically movable in guides, by means of ropes D, roller E, and winding-drum F, in combination with the friction-shoe $d$, set-screw G, and wheel $b$, on the end of winding-drum F, substantially as and for the purpose set forth.

2. In a cotton-press, the press-box A, vertically movable in guides, as set forth, friction-shoe $d$, set-screw G, and wheel $b$ on the end of winding-drum F, in combination with the shaft H, having flange $i$, pulleys $h$ $j$, endless belt J, shaft K, and lever M, substantially as and for the purpose set forth.

In testimony that we claim the above we have hereunto subscribed our names in the presence of two witnesses.

ROBT. MACKEY.
MATTHEW GREEN.

Witnesses:
JOHN T. BIRDSEYE,
C. A. ROCKWOOD.